Patented Mar. 8, 1932

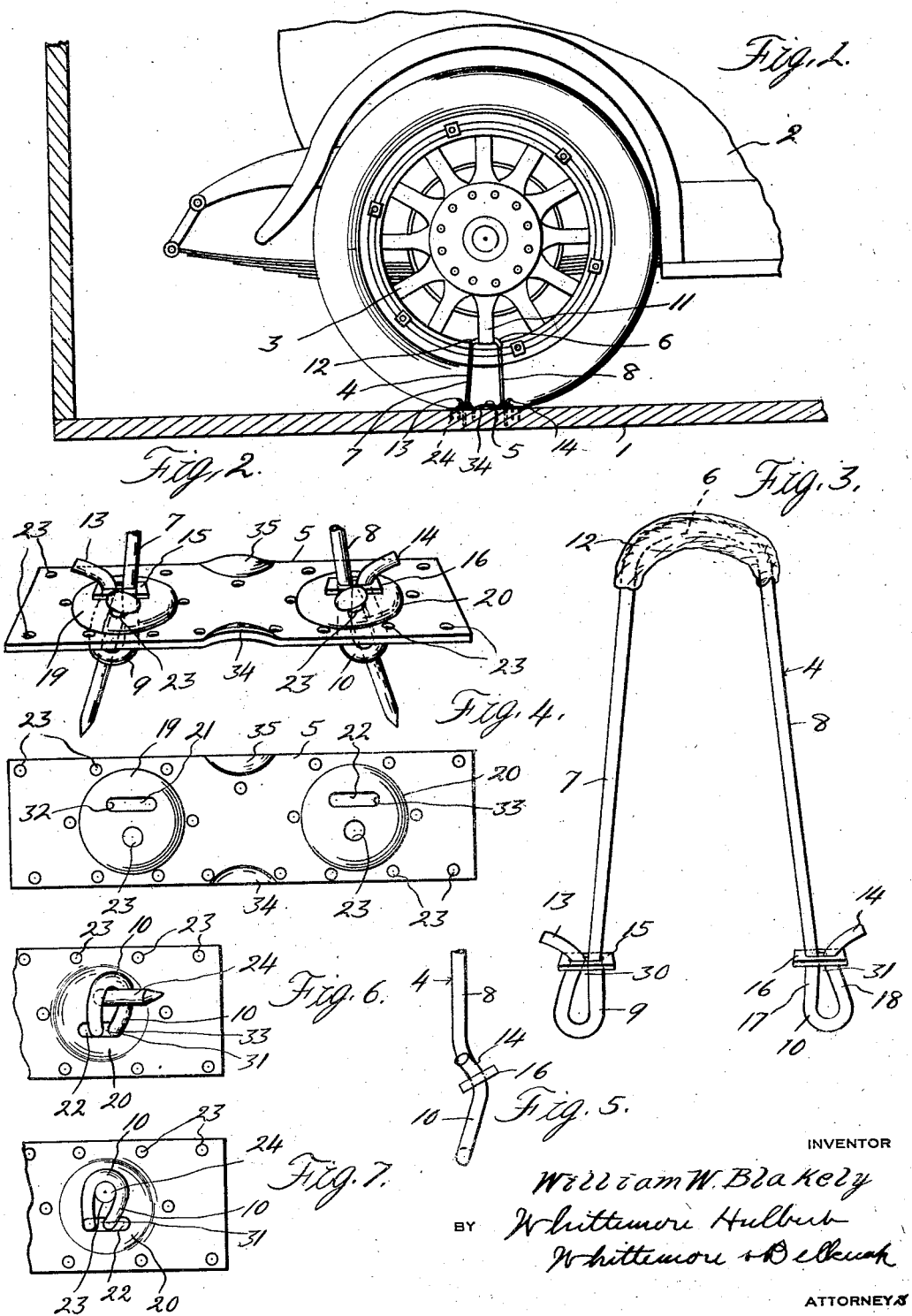

1,848,930

UNITED STATES PATENT OFFICE

WILLIAM W. BLAKELY, OF DEXTER, MICHIGAN

VEHICLE HOLDDOWN

Application filed August 26, 1929. Serial No. 388,587.

This invention relates generally to devices for holding merchandise such as automobiles within suitable carriers such as freight cars while in transit, and consists of certain novel features of construction, combinations and arrangements of parts that will be hereinafter more fully described, and particularly pointed out in the appended claims.

Heretofore automobiles have had relatively large wheels or fellies and the brake drums carried thereby have been relatively small. However, lately smaller wheels and fellies have been used and in many instances the brake drums have been enlarged. As a result, the space between the felly and the drum of a wheel is smaller and a hold-down with floor plates attached to the leg portions can not be inserted between the felly and the drum to engage a spoke preparatory to being secured to the flooring of a freight car. With the present invention the floor plates are separate from the tie members and are connected thereto after the tie members have been applied to the spokes. Thus, holddowns embodying my invention may be used in comparatively small spaces where clearances between fellies and brake drums are reduced.

In the accompanying drawings:

Figure 1 is a sectional view of a freight car and showing a hold-down device embodying my invention applied to a wheel of an automobile;

Figure 2 is a fragmentary perspective view of the hold-down per se;

Figure 3 is a detail view of the tie-member;

Figure 4 is a detail view of the floor plate;

Figure 5 is a fragmentary side elevation of the tie member;

Figure 6 is a bottom plan view of a portion of the construction illustrated in Figure 2;

Figure 7 is a view similar to Figure 6 when attached to the flooring.

Referring now to the drawings, 1 is the flooring of a carrier such as a freight car, 2 is an automobile having spoke wheels 3 on the flooring, 4 is a tie member and 5 is an anchorage or floor plate for the tie member. As shown, the tie member 4 is formed from a single length of heavy gauge wire and has a U-shaped portion 6, a pair of legs 7 and 8 that diverge downwardly from but are at substantially an obtuse angle to the U-shaped portion 6, and a pair of attaching feet 9 and 10 that are at an obtuse angle to the legs 7 and 8. Preferably the U-shaped portion 6 and feet 9 and 10 extend in opposite directions from the legs 7 and 8 and are engageable with a wheel spoke 11 and the flooring 1 respectively. The U-shaped portion 6 has a cover 12 of burlap so that it will not mar the finish of the spoke 11 when applied thereto. The feet 9 and 10 are in the form of loops and are upon the outer sides of the legs 7 and 8. As shown, these loops are formed by bending the wire in substantially straight lines but at obtuse angles to the legs 7 and 8, then laterally and rearwardly to the lower ends of the legs and finally turning the free end portions 13 and 14 laterally away from the legs. Tie plates 15 and 16 are sleeved upon the straight and returned bent portions 17 and 18 of the feet at the lower ends of the legs.

The floor plate 5 is elongated in form and serves as an anchorage member for both legs 7 and 8. As shown, the plate 5 is provided at points spaced longitudinally thereof with upwardly arched or dished portions 19 and 20 of circular formation for receiving the feet 9 and 10 when attached to flooring and is provided with two longitudinally extending elongated slots 21 and 22 and a plurality of circular openings 23. The slots 21 and 22 are in the dished portions 19 and 20 and are adapted to receive the feet 9 and 10, while the openings 23 are scattered about in the plate and are adapted to receive suitable securing elements such as the nails 24. Preferably two of the openings 23 are in the dished portions 19 and 20, one in each portion, for receiving two of the nails 24. As shown, the slots 21 and 22 are in a common plane, and the openings 23 in the dished portions 19 and 20 are in a common plane that is substantially parallel to the plane in which the slots 21 and 22 are located. Moreover, such openings 23, i. e., those in the dished portions 19 and 20, are opposite the centers of the slots 21 and 22.

In use, the tie member 4 and plate 5 are temporarily assembled by inserting the feet 9 and 10 through the slots 21 and 22 and inserting nails 24 through the openings 23 in the dished portions 19 and 20 and through the loops 9 and 10. As shown in Figure 3, the distance between the feet 9 and 10 is greater than the distance between the slots 21 and 22. Hence to insert the feet 9 and 10 through the slots 21 and 22 it is necessary to press the legs 7 and 8 slightly toward each other to align the laterally offset feet 9 and 10 with the slots. If the feet are inserted in the slots, the spring tension of the legs 7 and 8 will cause the narrow portions 30 and 31 of the feet to engage the outer ends 32 and 33 respectively of the slots and will thereby move the return bent portions 18 of the feet out of alignment with the openings in the dished portions 19 and 20. Before being applied to the flooring the nails 24 extending through the openings 23 in the dished portions of the feet 9 and 10 will be held against the edges of the openings 23 in the dished portions by the straight portions 17 of the feet. (Figure 2.) Thus, the tie member 4, plate 5 and two nails 24 as a unit may be carried to the proper point of the carrier and may be quickly disassembled by merely pressing the legs 7 and 8 toward each other so that the nails 24 will be released by the straight portions 17 aforesaid and then turning the device upside down while the nails are released so that they will fall out of the openings 23 in the dished portions aforesaid. The tie member 4 may then be separated from the floor plate and applied to a spoke. The feet 9 and 10 are again inserted through the slots 21 and 22 in the plate and the latter is then secured to the flooring 1 of the carrier to hold the vehicle in place. Preferably the plate 5 is provided between the dished portions 19 and 20 with arched portions 34 and 35 which may be engaged by suitable tool brackets (not shown) when it is desired to pry the plate 5 from the flooring as being secured thereto.

Thus, from the foregoing description it will be readily apparent that I have provided a very efficient hold-down that may be applied to the spokes of the wheels regardless of the size of the brake drums. Moreover, a single floor plate such as 5 serves as anchorage means for both legs 7 and 8, and the construction and arrangement of the tie member and plate are such that the parts, including two nails, may be temporarily held assembled so that such parts may be conveniently moved about as a unit. In fact, the same nails used as ties between the temporarily assembled parts may later be used as two of the securing elements for the plates. Thus, time and labor heretofore required to locate and carry separate parts to the proper points of attachment in carriers have been obviated.

What I claim as my invention is:

1. In a vehicle hold-down, an anchorage plate having laterally spaced slots for receiving portions of a tie member and provided intermediate said slots with an arched portion.

2. In a vehicle hold-down, a floor plate having laterally spaced upwardly embossed portions and provided at an edge thereof intermediate said embossed portions with another upwardly extending embossed portion, each of the first mentioned portions having a slot for receiving a portion of a tie member and having an opening for receiving a nail and the like adapted to secure the plate to the flooring of a suitable carrier, and the last mentioned portion being adapted to be engaged by a tool when it is desired to pry the plate and nail from the flooring.

3. In a vehicle hold-down, a floor plate having spaced slots and spaced openings therein, said openings being adjacent the centers of said slots, an inverted U-shaped tie member having substantially straight leg portions provided at their lower ends with return bent portions for insertion in said slots, and nails extending through the openings in the plate and between said straight and return bent portions, the distance between the lower ends of said straight portions when said tie member is removed from the plate being greater than the distance between the slots in said plate whereby said straight portions have to be pressed toward each other to be inserted into said slots, and when disposed in said slots are under tension and clamp the nails against the edges of the openings in the plate, and said return bent portions are under compression and abut the outermost ends of the slots in said plates.

4. In a vehicle hold-down, a floor plate having spaced slots and openings therein, means for securing said plate to the flooring of a freight car and the like including nails extending through the openings in said plate, and an inverted substantially U-shaped tie member having the leg portions thereof extending through said slots and constructed and arranged in such a way that they clamp the nails against certain edges of the openings in said plate whereby said nails and leg portions will remain in the plate as a portable unit before being applied to the flooring.

In testimony whereof I affix my signature.

WILLIAM W. BLAKELY.